United States Patent
Matsumura et al.

(10) Patent No.: US 12,388,575 B2
(45) Date of Patent: Aug. 12, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 427 days.

(21) Appl. No.: 17/917,731

(22) PCT Filed: Apr. 9, 2020

(86) PCT No.: PCT/JP2020/015957
§ 371 (c)(1),
(2) Date: Oct. 7, 2022

(87) PCT Pub. No.: WO2021/205598
PCT Pub. Date: Oct. 14, 2021

(65) Prior Publication Data
US 2023/0163886 A1     May 25, 2023

(51) Int. Cl.
*H04L 1/1812* (2023.01)
*H04L 5/00* (2006.01)
*H04W 72/232* (2023.01)

(52) U.S. Cl.
CPC .......... *H04L 1/1812* (2013.01); *H04L 5/0053* (2013.01); *H04W 72/232* (2023.01)

(58) Field of Classification Search
CPC ... H04L 1/1812; H04L 1/1896; H04L 1/1891; H04L 5/0053; H04L 5/001; H04L 5/0055; H04W 72/232
See application file for complete search history.

(56) References Cited

U.S. PATENT DOCUMENTS

| | | | |
|---|---|---|---|
| 2022/0022237 A1* | 1/2022 | Kim | H04L 1/1864 |
| 2022/0077969 A1* | 3/2022 | Kim | H04L 1/1861 |
| 2023/0189261 A1* | 6/2023 | Matsumura | H04W 72/1273 |
| | | | 370/329 |

OTHER PUBLICATIONS

International Search Report issued in PCT/JP2020/015957 on Nov. 10, 2020 (1 page).

(Continued)

*Primary Examiner* — Jianye Wu
(74) *Attorney, Agent, or Firm* — Osha Bergman Watanabe & Burton LLP

(57) ABSTRACT

A terminal according to one aspect of the present disclosure has a control section that judges indexing of Physical Downlink Control Channel (PDCCH) monitoring occasions or Downlink Control Information (DCI) formats associated with joint feedback, when the terminal is not provided with any CORESET pool index or is provided with a CORESET pool index with a value of "0" for one or more first control resource sets (COntrol REsource SETs (CORESETs)) and is provided with a CORESET pool index with a value of "1" for one or more second CORESETs on an active Downlink Bandwidth Part (DL BWP) of a serving cell, and Acknowledgement (ACK)/Negative Acknowledgement (ACNACK) feedback mode=joint feedback is provided for the serving cell, and a transmitting section that transmits a HARQ-ACK using a Hybrid Automatic Repeat reQuest (HARQ)-ACK codebook or Physical Uplink Control Channel (PUCCH) resource determined based on the indexing. According to one aspect of the present disclosure, in the case of using multi-panel/TRP, it is possible to suitably perform HARQ-ACK feedback.

4 Claims, 6 Drawing Sheets

(56) References Cited

OTHER PUBLICATIONS

Written Opinion of the International Searching Authority issued in PCT/JP2020/015957 on Nov. 10, 2020 (3 pages).
Huawei, HiSilicon; "Summary of Enhancements on Multi-TRP/Panel Transmission"; 3GPP TSG RAN WG1 Meeting #98, R1-1909602; Prague, Czech Republic; Aug. 26-30, 2019 (76 pages).
3GPP TS 38.213 V16.6.0; "3rd Generation Partnership Project; Technical Specification Group Radio Access Network; NR; Physical layer procedures for control (Release 16)"; Dec. 2019 (146 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 202080101939.0; Dated Jun. 12, 2024 (13 pages).
Office Action issued in Japanese Patent Application No. 2022-513795, mailed on Apr. 2, 2024 (8 pages).
Office Action issued in Chinese Application No. 202080101939.0, mailed Mar. 19, 2025 (13 pages).
Office Action issued in Chinese Application No. 202080101939.0; Dated Nov. 28, 2024 (11 pages).

* cited by examiner

TERMINAL, RADIO COMMUNICATION METHOD, AND BASE STATION

TECHNICAL FIELD

The present disclosure relates to a terminal, radio communication method and base station in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of higher capacity, more sophistication and the like than LTE (Third Generation Partnership Project (3GPP) Release (Rel.) 8, 9), LTE-Advanced (3GPP Rel. 10-14) has been specified.

Successor systems (e.g., also referred to as 5th generation mobile communication system (5G), 5G+ (plus), 6th generation mobile communication system (6G), New Radio (NR), 3GPP Rel.15 onward, etc.) to LTE have also been studied.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

DISCLOSURE OF INVENTION

Problems to be Solved by the Invention

In NR, it is studied that one or a plurality of transmission/reception points (Transmission/Reception Point (TRP)) (multi-TRP) performs DL transmission (e.g., Physical Downlink Shared Channel (PDSCH) transmission) to a user terminal (User Equipment (UE)) using one or a plurality of panels (multi-panel).

In NR, with respect to a plurality of PDSCHs (which may also be called multiple PDSCH) from multi-TRP, it is studied to use joint HARQ-ACK feedback for transmitting Hybrid Automatic Repeat reQuest ACKnowledgements (HARQ-ACKs) in response to PDSCHs of a plurality of TRPs to one TRP, and separate HARQ-ACK feedback for transmitting an individual HARQ-ACK to each TRP.

In Rel. 16 NR, it is studied to configure a feedback mode on a UE, using a higher layer parameter (which may also be called "ackNackFeedbackMode", "ackNackFeedbackMode-r16", ACKNACK feedback mode, etc.) indicating whether a feedback mode used within one slot is joint feedback or separate feedback.

However, in the case where the UE is configured for joint feedback as the ACKNACK feedback mode, it has not been studied sufficiently how to determine bits of Type-2 HARQ-ACK codebook, how to determine PUCCH resources for performing joint feedback and the like. Unless such configurations are clarified, in the case of multi-TRP, it is not possible to properly perform HARQ-ACK feedback, and there is the risk that throughput degrades or communication quality deteriorates.

Therefore, it is an object of the present disclosure to provide a terminal, radio communication method and base station for suitably performing HARQ-ACK feedback in the case of using multi-panel/TRP.

Means for Solving the Problem

A terminal according to one aspect of the present disclosure has a control section for judging indexing of Physical Downlink Control Channel (PDCCH) monitoring occasions or Downlink Control Information (DCI) formats associated with joint feedback, when the terminal is not provided with any CORESET pool index or is provided with a CORESET pool index with a value of "0" for one or more first control resource sets (COntrol REsource SETs (CORESETs)) and is provided with a CORESET pool index with a value of "1" for one or more second CORESETs on an active Downlink Bandwidth Part (DL BWP) of a serving cell, and Acknowledgement (ACK)/Negative Acknowledgement (NACK) feedback mode=joint feedback is provided for the serving cell, and a transmitting section for transmitting a HARQ-ACK using a Hybrid Automatic Repeat reQuest (HARQ)-ACK codebook or Physical Uplink Control Channel (PUCCH) resource determined based on the indexing.

Advantageous Effect of the Invention

According to one aspect of the present disclosure, it is possible to suitably perform HARQ-ACK feedback in the case of using multi-panel/TRP.

Figure 1:
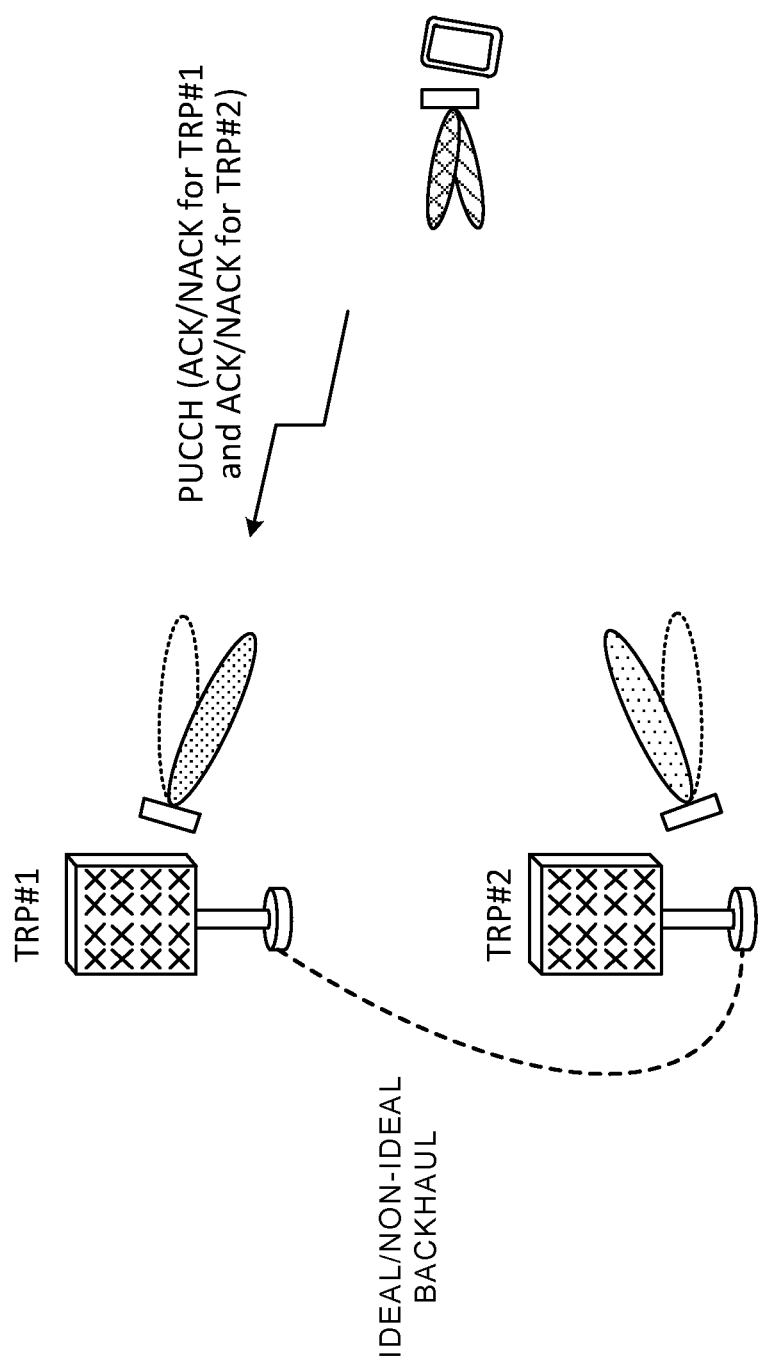
FIG. 1 is a diagram showing one example of multi-TRP scenarios.

BEST MODE FOR CARRYING OUT THE INVENTION (HARQ-ACK Codebook)

A UE may transmit HARQ-ACK feedback using one PUCCH resource, on a HARQ-ACK codebook basis comprised of bits of one or more receipt confirmation information (e.g., Hybrid Automatic Repeat reQuest ACKnowledgement (HARQ-ACK)). The HARQ-ACK bit may be called HARQ-ACK information, HARQ-ACK information bit and the like.

Herein, the HARQ-ACK codebook may be configured by including bits for HAQR-ACK on a basis of at least one of a time domain (e.g., slot), frequency domain (e.g., Component Carrier (CC)), spatial domain (e.g., layer), Transport Block (TB), and a Code Block Group (CBG) constituting the TB. The HAQR-ACK codebook may be called simply a codebook.

In addition, the number of bits (size) and the like included in the HARQ-ACK codebook may be determined semi-statically or dynamically. The HARQ-ACK codebook with the size determined semi-statically is also called a semi-static HARQ-ACK codebook, Type-1 HARQ-ACK codebook and the like. The HARQ-ACK codebook with the size determined dynamically is also called a dynamic HARQ-ACK codebook, Type-2 HARQ-ACK codebook and the like.

Whether to use the Type-1 HARQ-ACK codebook or the Type-2 HARQ-ACK codebook may be configured on the UE using a higher layer parameter (e.g., pdsch-HARQ-ACK-Codebook).

In the case of the Type-1 HARQ-ACK codebook, in some range (e.g., range configured based on the higher layer parameter), irrespective of the presence or absence of PDSCH scheduling, the UE may transmit, as feedback, a HARQ-ACK bit in response to a PDSCH candidate (or PDSCH occasion) corresponding to the range.

The range may be determined based on at least one of some period (e.g., set of the particular number of occasions for PDSCH reception as candidates or the particular number of monitoring occasions of Physical Downlink Control Channel (PDCCH)), the number of CCs configured or activated for the UE, the number of TBs (the number of layers or rank), the number of CBGs per TB, and the presence or absence of application of spatial bundling. The particular range is also called a HARQ-ACK window, HARQ-ACK bundling window, HARQ-ACK feedback window and the like.

In the Type-1 HARQ-ACK codebook, within the particular range, even in the case where scheduling of a PDSCH for the UE is absent, the UE reserves a HARQ-ACK bit in response to the PDSCH in the codebook. In the case where the UE determines that the PDSCH is actually not scheduled, the UE is capable of transmitting the bit as a NACK bit as feedback.

On the other hand, in the case of the Type-2 HARQ-ACK codebook, in the above-mentioned particular range, the UE may transmit a HARQ-ACK bit in response to a scheduled PDSCH as feedback.

Specifically, the UE may determine the number of bits of the Type-2 HARQ-ACK codebook based on a particular field (e.g., Downlink Assignment Indicator (Index) (DAI) field) in DCI. The DAI field may include a Counter DAI (C-DAI)) and a Total DAI (T-DAI).

The C-DAI may indicate a counter value of downlink transmission (PDSCH, data, TB) scheduled within a particular period. For example, the C-DAI in DCI for scheduling data within the particular period may indicate the number counted first in the frequency domain (e.g., CC) and subsequently time domain within the particular period. For example, with respect to one or more pieces of DCI included in a particular period, the C-DAI may correspond to a value obtained by counting PDSCH reception or Semi-Persistent Scheduling (SPS) release in ascending order of serving cell indexes and next in ascending order of PDCCH monitoring occasions.

The T-DAI may indicate a total value (total number) of items of data scheduled in a particular period. For example, the T-DAI in DCI for scheduling data in some time unit (e.g., PDCCH monitoring occasion) within the particular period may indicate the total number of items of data scheduled up to the time unit (also called a point, timing, etc.) within the particular period.

(Multi-TRP)

In NR, it is studied that one or a plurality of transmission/reception points (Transmission/Reception Point (TRP)) (multi TRP (MTRP)) performs DL transmission to a UE, using one or a plurality of panels (multi-panel). Further, it is studied that the UE performs UL transmission to one or a plurality of TRPs using one or a plurality of panels.

In addition, a plurality of TRPs may correspond to the same cell Identifier (ID), or may correspond to different cell IDs. The cell ID may be a physical cell ID or may be a virtual cell ID.

FIG. 1 is a diagram showing one example of multi-TRP scenarios. In these examples, it is assumed that each TRP and UE are capable of using two different beams, but the invention is not limited thereto.

The multi-TRP (TRPs *1, *2) may be connected by ideal/non-ideal backhaul to transmit and receive information, data and the like. Each TRP of the multi-TRP may transmit a respective different code word (Code Word (CW)) and different layer. As one aspect of multi-TRP transmission, Non-Coherent Joint Transmission (NCJT) may be used.

In NCJT, for example, the TRP *1 modulates a first code word to map, performs layer mapping on the first number of layers (e.g., 2 layers) using first precoding, and transmits a first PDSCH. Further, the TRP *2 modulates a second code word to map, performs layer mapping on the second number of layers (e.g., 2 layers) using second precoding, and transmits a second PDSCH.

In addition, a plurality of PDSCHs (multiple PDSCH) subjected to NCJT may be defined to overlap partially or completely with respect to at least one of the time and frequency domains. In other words, at least one of time and frequency resources may overlap in the first PDSCH from the first TRP and the second PDSCH from the second TRP.

These first and second PDSCHs may be assumed to be not in a Quasi-Co-Location (QCL) relationship (not quasi-co-located). Reception of multiple PDSCH may be read with simultaneous reception of PDSCHs that are not some QCL type (e.g., QCL-Type-D).

Based on one or a plurality of pieces of DCI, the UE receives a plurality of PDSCHs (which may be called multiple PDSCH) from multi-TRP. Further, in the example, with respect to the multiple PDSCH, the UE transmits, to one TRP (TRP *1 or *2), the HARQ-ACK (Acknowledgment (ACK)/Negative Acknowledgment (NACK)) in response to the PDSCH of the TRP *1 and the HARQ-ACK (ACK/NACK) in response to the PDSCH of the TRP *2. Such HARQ-ACK feedback may be called joint feedback, joint HARQ-ACK feedback and the like.

In addition, the UE may transmit an individual HARQ-ACK with respect to each TRP to a different TRP. Such HARQ-ACK feedback may be called separate feedback, separate HARQ-ACK feedback and the like. In the present disclosure, "separate" may mutually be read with "independent".

According to such multi-TRP scenarios, it is possible to perform flexible transmission control using a channel with good quality.

In Rel. 16 NR, it is studied to configure a feedback mode on a UE, using a higher layer parameter (which may also be called "ackNackFeedbackMode", "ackNackFeedbackMode-r16", ACKNACK feedback mode, etc.) indicating whether a feedback mode used within one slot is joint feedback or separate feedback.

However, in the case where the UE is configured for joint feedback as the ACKNACK feedback mode, it has not been studied sufficiently how to determine bits of Type-2 HARQ-ACK codebook (which may be called also joint dynamic HARQ-ACK codebook, joint Type-2 HARQ-ACK codebook, etc.), how to determine PUCCH resources for performing joint feedback and the like.

For example, in determination of bits of Type-2 HARQ-ACK codebook, the UE determines PDCCH monitoring occasions for PDCCHs of a DCI format for scheduling PDSCH reception or SPS PDSCH release associated with the same PUCCH of a slot for transmitting a HARQ-ACK, assigns indexes to the PDCCH monitoring occasions based on some rule, and based on the indexes, determines the order of bits of the Type-2 HARQ-ACK codebook. However, studies have not proceeded yet on the rule for the joint Type-2 HARQ-ACK codebook.

Unless such configurations are clarified, in the case of multi-TRP, it is not possible to properly perform HARQ-ACK feedback, and there is the risk that throughput degrades or communication quality deteriorates.

Therefore, the inventors of the present invention conceived methods to suitably perform HARQ-ACK feedback in the case of using multi-panel/TRP.

Embodiments according to the present disclosure will be described below in detail with reference to drawings. Radio communication methods according to respective Embodiments may be used alone, or may be used in combination.

In the present disclosure, "A/B" and "at least one of A and B" may be read with each other.

In the present disclosure, the panel, Uplink (UL) transmission entity, TRP, spatial relationship, control resource set (COntrol REsource SET (CORESET)), PDSCH, codeword, base station, antenna port (e.g., demodulation reference signal (DeModulation Reference Signal (DMRS)) port) of some signal, antenna port group (e.g., DMRS port group) of some signal, group (e.g., Code Division Multiplexing (CDM) group, reference signal group, CORESET group) for multiplexing, CORESET pool, CW, redundancy version (RV) and layer (MIMO layer, transmission layer, spatial layer) may be read with one another. Further, the panel Identifier (ID) and panel may be read with each other. In the present disclosure, the TRP ID and TRP may be read with each other.

In the present disclosure, the index, ID, indicator, resource ID and so on may be read with one another.

(Radio Communication Method)

Embodiment 1

In Embodiment 1, a set of PDCCH monitoring occasions for DCI formats to schedule PDSCH reception or SPS PDSCH release is defined as a union of PDCCH monitoring occasions across active Downlink Bandwidth Parts (DL BWPs) of configured serving cells.

In Embodiment 1, PDCCH monitoring occasions are first indexed (numbered) in ascending order across serving cells indexes for a same start time of search space sets associated with DCI formats scheduling PDSCH receptions or SPS PDSCH release on the serving cells, and are then indexed in ascending order of start times of the search space sets.

For indexing within a serving cell for a same start time of these search space sets, when the UE is not provided with any CORESETPoolIndex or is provided with CORESETPoolIndex with value 0 for one or more first CORESETs, and is provided with CORESETPoolIndex with value 1 for one or more second CORESETs on an active DL BWP of a serving cell, and ACKNACKFeedbackMode=jointFeedback is provided for the serving cell, PDCCH monitoring occasions for the first CORESETs are indexed prior to PDCCH monitoring occasions for the second CORESETs.

The cardinality of the set of PDCCH monitoring occasions defines a total number M of PDCCH monitoring occasions.

In addition, in the present disclosure, "ACKNACKFeedbackMode=JointFeedback is provided for the serving cell" may be mutually read with "ACKNACKFeedbackMode=JointFeedback is provided", "ACKNACKFeedbackMode=JointFeedback is provided for a cell group to which the serving cell belongs" and the like.

In addition, the higher layer parameter (e.g., ackNACK-FeedbackMode) indicating an ACKNACK feedback mode may be configured for each serving cell, or may be configured for each cell group.

For determined PDCCH monitoring occasions corresponding to the joint HARQ-ACK feedback, the UE may assign indexes based on the above-mentioned indexing rule, and based on the indexes, determine the joint Type-2 HARQ-ACK codebook.

Figure 2:
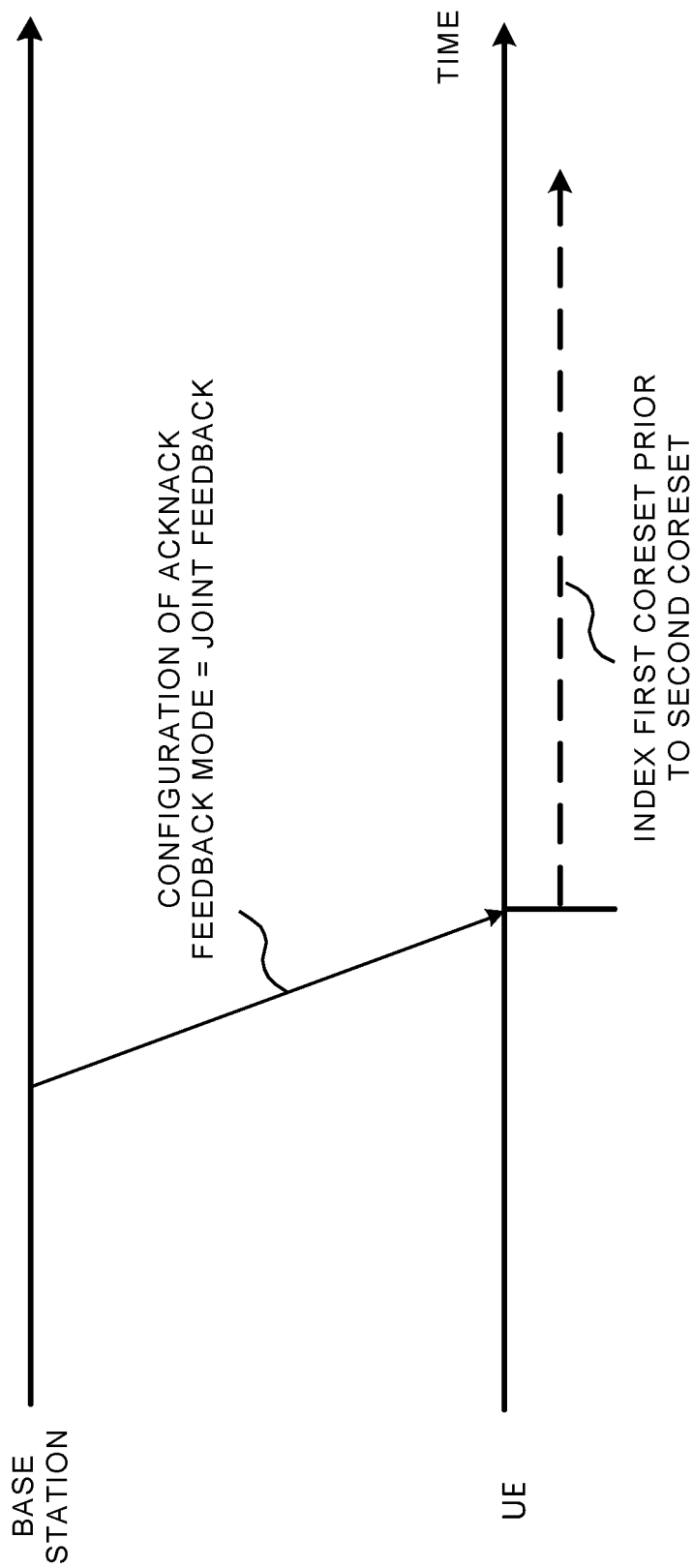
FIG. 2 is a diagram showing one example of operation of Embodiment 1.

FIG. 2 is a diagram showing one example of operation of Embodiment 1. In the example, with respect to an active DL BWP of some serving cell, the case is assumed where the UE is already configured for a first CORESET corresponding to the CORESETPoolIndex with a value of "0", and a second CORESET corresponding to the CORESETPoolIndex with a value of "1".

In FIG. 2, at some timing, the base station configures ACKNACKFeedbackMode=JointFeedback on the UE. When this configuration is enabled, the UE indexes the first CORESET (PDCCH monitoring occasions for the first CORESET) prior to the second CORESET (PDCCH monitoring occasions for the second CORESET).

Until the configuration is received or enabled, the UE does not need to (may not) index the first CORESET (PDCCH monitoring occasions for the first CORESET) prior to the second CORESET (PDCCH monitoring occasions for the second CORESET).

According to Embodiment 1 described above, according to the above-mentioned indexing rule, it is possible to properly determine the joint Type-2 HARQ-ACK codebook.

Embodiment 2

In Embodiment 2, with respect to PUCCH transmission (e.g., joint feedback transmission) having HARQ-ACK information, the UE determines one PUCCH resource, after determining one set of a plurality of PUCCH resources.

The PUCCH resource determination is based on a PUCCH resource indicator field (if present). Herein, the PUCCH resource indicator field is included in a last DCI format among DCI formats that have values indicating the same slot for PUCCH transmission which the UE detects to transmit corresponding HARQ-ACK information in the PUCCH. The value indicating the same slot may be a value of PDSCH-to-HARQ_feedback timing indicator field (if present), a value of dl-DataToUL-ACK indicating a period of UL-ACK from DL data, or a value of dl-DataToUL-ACKForDCIFormat1_2 indicating a period of UL-ACK from DL data for DCI format 1_2.

In Embodiment 2, for PUCCH resource determination, detected DCI formats are first indexed in ascending order across serving cells indexes for a same PDCCH monitoring occasion and are then indexed in ascending order across a plurality of PDCCH monitoring occasion indexes.

In indexing DCI formats within a serving cell for a same PDCCH monitoring occasion, when the UE is not provided with any CORESETPoolIndex or is provided with CORESETPoolIndex with value 0 for one or more first CORE- SETs, and is provided with CORESETPoolIndex with value 1 for one or more second CORESETs on an active DL BWP of a serving cell, and ACKNACKFeedbackMode= Joint-Feedback is provided for the active UL BWP, DCI formats detected from PDCCH receptions in the first CORESETs are indexed prior to DCI formats detected from PDCCH receptions in the second CORESETs.

According to Embodiment 2 described above, according to the above-mentioned indexing rule, the last DCI format is determined, and it is possible to properly determine PUCCH resources for performing joint feedback.

Other Embodiments

The UE provided with ACKNACKFeedbackMode= JointFeedback may use the following indexing rule, as a substitute for the indexing rule in Embodiment 1:

The set of PDCCH monitoring occasions for a DCI format scheduling PDSCH receptions or SPS PDSCH release is defined as the union of PDCCH monitoring occasions across active DL BWPs of configured serving cells, and is ordered in ascending order of start times of the search space set associated with a PDCCH monitoring occasion.

According to the indexing rule, it is possible to determine indexes of PDCCH monitoring occasions based on only in the time domain, judge without being dependent on elements such as the frequency domain and CORESET pool (or TRP) domain, and to expect reductions in UE load and the like.

In addition, also in the case of using the above-mentioned indexing rule as a substitute for the indexing rule of Embodiment 1, the indexing rule of Embodiment 2 may be used.

[Modifications of First and Second CORESETs]

In each of the above-mentioned Embodiments, the first CORESET corresponds to a CORESET which is not provided with the CORESETPoolIndex or which is provided with the CORESETPoolIndex with a value of "0", and the second CORESET corresponds to a CORESET provided with the CORESETPoolIndex with a value of "1", but the invention is not limited thereto.

For example, the first CORESET may be read with a CORESET which is not provided with the CORESETPoolIndex, and the second CORESET may be read with a CORESET provided with the CORESETPoolIndex with a value of "1".

For example, the first CORESET may be read with the CORESET which is not provided with the CORESETPoolIndex, and the second CORESET may be read with a CORESET provided with the CORESETPoolIndex (with any value).

Further, in the present disclosure, the case where the UE is not provided with the CORESETPoolIndex or is provided with the CORESETPoolIndex with value 0 for one or more first CORESETs, and is provided with the CORESETPoolIndex with value 1 for one or more second CORESETs on an active DL BWP of a serving cell may mutually be read with the case where the UE is not provided with the CORESETPoolIndex or is provided with the CORESETPoolIndex with value 0 for one or more first CORESETs on an active DL BWP of a serving cell, and is provided with the CORESETPoolIndex with value 1 for one or more second CORESETs on an active DL BWP of a serving cell.

Further, in the present disclosure, an active DL BWP may be mutually read with active DL BWPs. Furthermore, in the present disclosure, "active DL BWP of a serving cell" which the first CORESET belongs to (or is associated with) may be the same or may be different as/from "active DL BWP of a serving cell" which the second CORESET belongs to (or is associated with).

(Radio Communication System)

A configuration of a radio communication system according to one Embodiment of the present disclosure will be described below. In the radio communication system, communication is performed by using one of radio communication methods according to the respective above-mentioned Embodiments of the disclosure or combination thereof.

Figure 3:
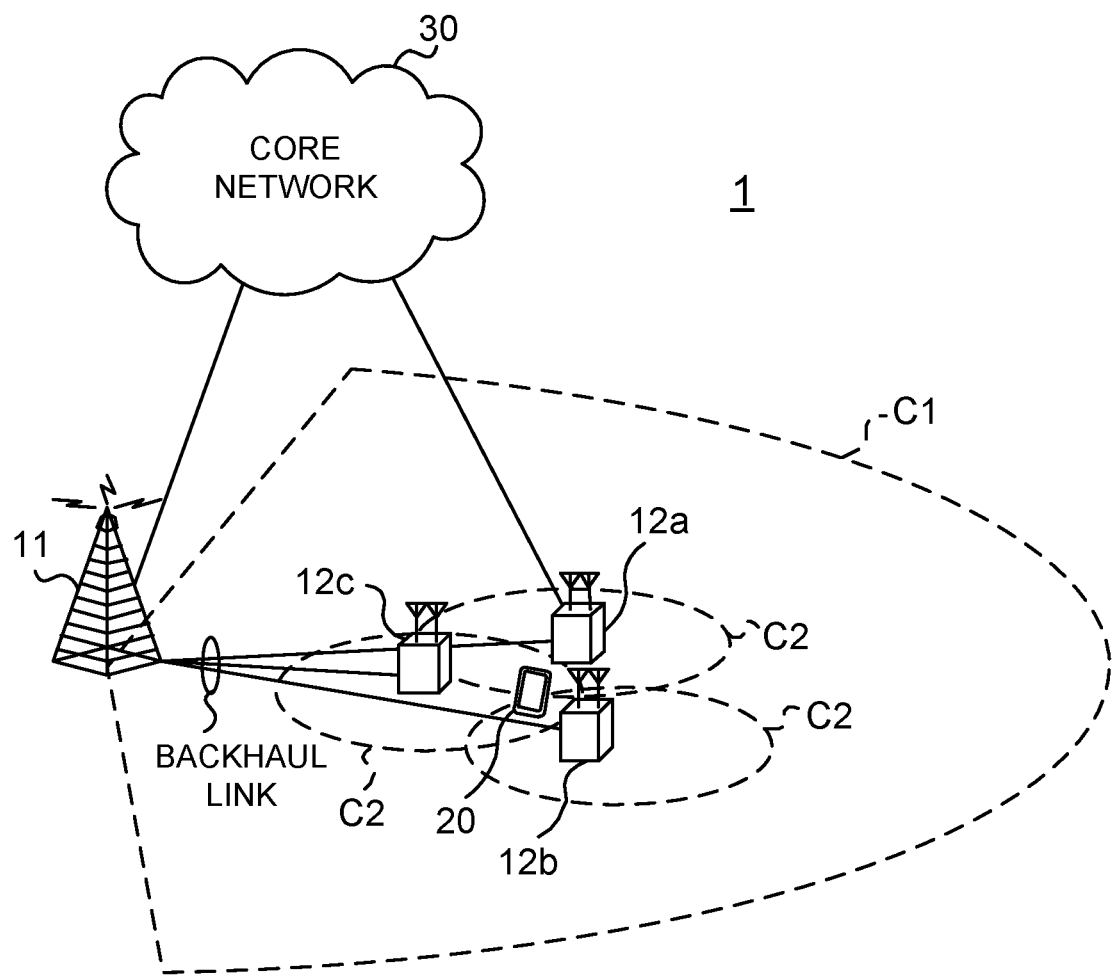
FIG. 3 is a diagram showing one example of a schematic configuration of a radio communication system according to one Embodiment.

FIG. 3 is a diagram showing one example of a schematic configuration of the radio communication system according to one Embodiment. The radio communication system 1 may be a system for actualizing communication using Long Term Evolution (LTE), 5th generation mobile communication system New Radio (5G NR) and the like specified by Third Generation Partnership Project (3GPP).

Further, the radio communication system 1 may support dual connectivity (Multi-RAT Dual Connectivity (MR-DC)) among a plurality of Radio Access Technologies (RAT). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and the like.

In EN-DC, a base station (eNB) of LTE (E-UTRA) is a master node (Master Node (MN)), and a base station (gNB) of NR is a secondary node (Secondary Node (SN)). In NE-DC, a base station (gNB) of NR is an MN, and a base station (eNB) of LTE (E-UTRA) is an SN.

The radio communication system 1 may support dual connectivity (e.g., dual connectivity (NR-NR Dual Connectivity (NN-DC) where both of the MN and SN are the base stations (gNB) of NR) among a plurality of base stations in the same RAT.

The radio communication system 1 may be provided with a base station 11 for forming a macrocell C1 with relatively wide coverage, and base stations 12 (12a to 12c) disposed inside the macrocell C1 to form small cells C2 narrower than the macrocell C1. A user terminal 20 may be positioned in at least one cell. The arrangement, numbers and the like of each cell and user terminal 20 are not limited to the aspect shown in the figure. Hereinafter, in the case of not distinguishing between the base stations 11 and 12, the stations are collectively called a base station 10.

The user terminal 20 may connect to at least one of a plurality of base stations 10. The user terminal 20 may use at least one of carrier aggregation (Carrier Aggregation (CA)) using a plurality of component carriers (Component Carrier (CC)) and dual connectivity (DC).

Each CC may be included in at least one of a first frequency band (Frequency Range 1 (FR1)) and second frequency band (Frequency Range 2 (FR2)). The macrocell C1 may be included in the FR1, and the small cell C2 may be included in the FR2. For example, the FR1 may be a frequency band (sub-6 GHz) of 6 GHz or less, and the FR2 may be a frequency band (above-24 GHz) higher than 24 GHz. In addition, the frequency bands, definitions and the like of the FR1 and FR2 are not limited thereto, and for example, the FR1 may correspond to a frequency band higher than the FR2.

Further, in each CC, the user terminal 20 may perform communication using at least one of Time Division Duplex (TDD) and Frequency Division Duplex (FDD).

A plurality of base stations 10 may be connected by cables (e.g., optical fiber in conformity with Common Public Radio Interface (CPRI), X2 interface, etc.), or by radio (e.g., NR communication). For example, in the case of using NR communication as backhaul between the base stations 11 and 12, the base station 11 corresponding to a higher station may be called an Integrated Access Backhaul (IAB) donor, and the base station 12 corresponding to a relay station (relay) may be called an IAB node.

The base station 10 may be connected to a core network 30 via another base station 10 or directly. For example, the core network 30 may include at least one of Evolved Packet Core (EPC), 5G Core Network (5GCN), Next Generation Core (NGC) and the like.

The user terminal 20 may be a terminal supporting at least one of communication schemes such as LTE, LTE-A, and 5G.

In the radio communication system 1, an Orthogonal Frequency Division Multiplexing (OFDM)-based radio access scheme may be used. For example, on at least one of downlink (Downlink (DL)) and uplink (Uplink (UL)) may be used Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA) and the like.

The radio access scheme may be called a waveform. In addition, in the radio communication system 1, another radio access scheme (e.g., another single carrier transmission scheme, another multi-carrier transmission scheme) may be used for the radio access scheme of UL and DL.

As downlink channels, in the radio communication system 1 may be used a downlink shared channel (Physical Downlink Shared Channel (PDSCH)) shared by user terminals 20, broadcast channel (Physical Broadcast Channel (PBCH)), downlink control channel (Physical Downlink Control Channel (PDCCH)) and the like.

Further, as uplink channels, in the radio communication system 1 may be used an uplink shared channel (Physical Uplink Shared Channel (PUSCH)) shared by user terminals 20, uplink control channel (Physical Uplink Control Channel (PUCCH)), random access channel (Physical Random Access Channel (PRACH)) and the like.

User data, higher layer control information, System Information Block (SIB) and the like are transmitted on the PDSCH. The user data, higher layer control information and the like may be transmitted on the PUSCH. Further, Master Information Block (MIB) may be transmitted on the PBCH.

Lower layer control information may be transmitted on the PDCCH. For example, the lower layer control information may include downlink control information (Downlink Control Information (DCI)) including scheduling information of at least one of the PDSCH and PUSCH.

In addition, DCI for scheduling the PDSCH may be called a DL assignment, DL DCI and the like, and DCI for scheduling the PUSCH may be called a UL grant, UL DCI and the like. In addition, the PDSCH may be read with DL data, and the PUSCH may be read with UL data.

For detection of the PDCCH, a control resource set (COntorl REsource SET (CORESET)) and search space may be used. The CORESET corresponds to resources to search for the DCI. The search space corresponds to a search region and search method of PDCCH candidates. One CORESET may be associated with one or a plurality of search spaces. The UE may monitor the CORESET related to some search space based on search space configuration.

One search space may correspond to PDCCH candidates corresponding to one or a plurality of aggregation levels. One or a plurality of search spaces may be called a search space set. In addition, the "search space", "search space set", "search space configuration", "search space set configuration", "CORESET", "CORESET configuration" and the like of the present disclosure may be read with one another.

On the PUCCH may be transmitted uplink control information (Uplink Control Information (UCI)) including at least one of Channel State Information (CSI), receipt confirmation information (for example, which may be called Hybrid Automatic Repeat reQuest ACKnowledgement (HARQ-ACK), ACK/NACK and the like) and Scheduling Request (SR). A random access preamble to establish connection with the cell may be transmitted on the PRACH.

In addition, in the present disclosure, the downlink, uplink and the like may be expressed without attaching "link". Further, various channels may be expressed without attaching "Physical" at the beginning.

In the radio communication system 1 may be transmitted a Synchronization Signal (SS), Downlink Reference Signal (DL-RS) and the like. As the DL-RS, in the radio communication system 1 may be transmitted a Cell-specific Reference Signal (CRS), Channel State Information Reference Signal (CSI-RS), demodulation reference signal (DeModulation Reference Signal (DMRS)), Positioning Reference signal (PRS), Phase Tracking Reference Signal (PTRS) and the like.

For example, the synchronization signal may be at least one of a Primary Synchronization Signal (PSS) and Secondary Synchronization Signal (SSS). A signal block including the SS (PSS, SSS) and PBCH (and DMRS for the PBCH) may be called an SS/PBCH block, SS Block (SSB) and the like. In addition, the SS, SSB and the like may also be called the reference signal.

Further, in the radio communication system 1, a Sounding Reference Signal (SRS), demodulation reference signal (DMRS) and the like may be transmitted as an Uplink Reference Signal (UL-RS). In addition, the DMRS may be called a user terminal-specific reference signal (UE-specific Reference Signal).

(Base Station)

Figure 4:
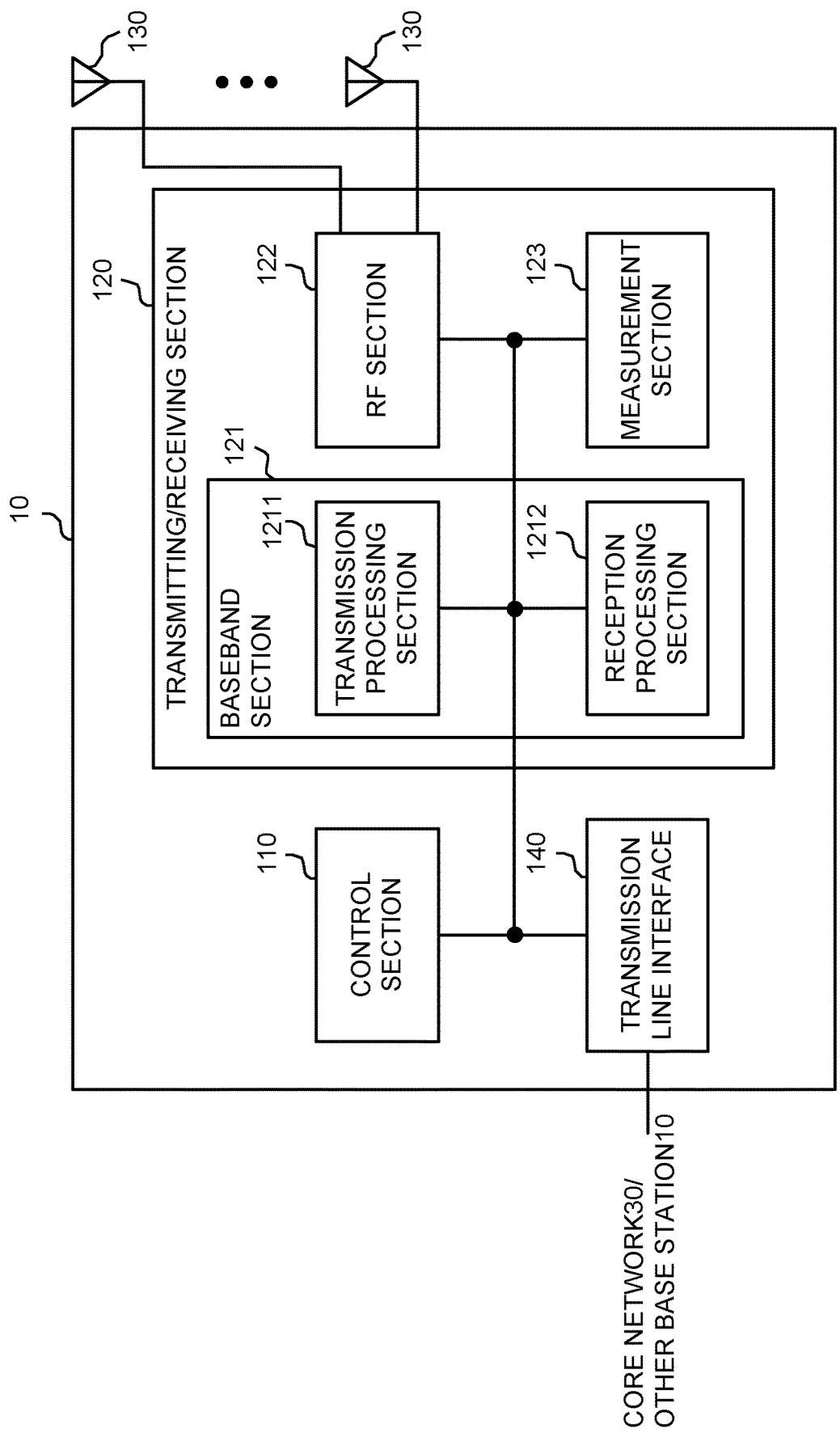
FIG. 4 is a diagram showing one example of a configuration of a base station according to one Embodiment.

FIG. 4 is a diagram showing one example of a configuration of the base station according to one Embodiment. The base station 10 is provided with a control section 110, transmitting/receiving section 120, transmitting/receiving antennas 130, and transmission line interface 140. In addition, the base station may be provided with one or more of each of the control section 110, transmitting/receiving section 120, transmitting/receiving antenna 130, and transmission line interface 140.

In addition, this example mainly illustrates function blocks of feature parts in this Embodiment, and the base station 10 may be assumed to have other function blocks required for radio communication. A part of processing of each section described below may be omitted.

The control section 110 performs control of the entire base station 10. The control section 110 is capable of being comprised of a controller, control circuit and the like explained based on common recognition in the technical field according to the present disclosure.

The control section 110 may control generation of signals, scheduling (e.g., resource allocation, mapping) and the like. The control section 110 may control transmission/reception, measurement and the like using the transmitting/receiving section 120, transmitting/receiving antenna 130 and transmission line interface 140. The control section 110 may generate data, control information, sequence and the like to transmit as a signal, and transfer the resultant to the transmitting/receiving section 120. The control section 110 may perform call processing (configuration, release, etc.) of a communication channel, state management of the base station 10, management of radio resources and the like.

The transmitting/receiving section 120 may include a baseband section 121, Radio Frequency (RF) section 122 and measurement section 123. The baseband section 121 may include a transmission processing section 1211 and reception processing section 1212. The transmitting/receiving section 120 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 120 may be comprised as an integrated transmitting/receiving section, or may be comprised of a transmitting section and a receiving section. The transmitting section may be comprised of a transmission processing section 1211 and RF section 122. The receiving section may be comprised of a reception processing section 1212, RF section 122, and measurement section 123.

The transmitting/receiving antenna 130 is capable of being comprised of an antenna, for example, an array antenna and the like explained based on the common recognition in the technical field according to the present disclosure.

The transmitting/receiving section 120 may transmit the above-mentioned downlink channel, synchronization signal, downlink reference signal and the like. The transmitting/receiving section 120 may receive the above-mentioned uplink channel, uplink reference signal and the like.

The transmitting/receiving section 120 may form at least one of a transmission beam and reception beam, using digital beam forming (e.g., precoding), analog beam forming (e.g., phase rotation) and the like.

The transmitting/receiving section 120 (transmission processing section 1211) may perform, for example, on the data, control information and the like acquired from the control section 110, processing of Packet Data Convergence Protocol (PDCP) layer, processing (e.g., RLC retransmission control) of Radio Link Control (RLC) layer, processing (e.g., HARQ retransmission control) of Medium Access Control (MAC) layer and the like to generate a bit sequence to transmit.

The transmitting/receiving section 120 (transmission processing section 1211) may perform, on the bit sequence to transmit, transmission processing such as channel coding (which may include error correcting coding), modulation, mapping, filter processing, Discrete Fourier Transform (DFT) processing (as necessary), Inverse Fast Fourier Transform (IFFT) processing, precoding and digital-analog conversion, and output a baseband signal.

The transmitting/receiving section 120 (FR section 122) may perform modulation to a radio frequency band, filter processing, amplification and the like on the baseband signal to transmit a signal of the radio frequency band via the transmitting/receiving antenna 130.

On the other hand, the transmitting/receiving section 120 (RF section 122) may perform amplification, filter processing, demodulation to a baseband signal and the like on a signal of the radio frequency band received by the transmitting/receiving antenna 130.

The transmitting/receiving section 120 (reception processing section 1212) may apply reception processing such as analog-digital conversion, Fast Fourier Transform (FTT) processing, Inverse Discrete Fourier Transform (IDFT) processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 120 (measurement section 123) may perform measurement on a received signal. For example, based on the received signal, the measurement section 123 may perform Radio Resource Management (RRM) measurement, Channel State Information (CSI) measurement and the like. The measurement section 123 may measure received power (e.g., Reference Signal Received Power (RSRP)), received quality (e.g., Reference Signal Received Quality (RSRQ), Signal to Interference plus Noise Ratio (SINR), Signal to Noise Ratio (SNR)), signal strength (e.g., Received Signal Strength Indicator (RSSI)), propagation path information (e.g., CSI) and the like. The measurement result may be output to the control section 110.

The transmission line interface 140 may transmit/receive signals (backhaul signaling) to/from an apparatus included in the core network 30, another base station 10 and the like to perform acquisition, transmission and the like of user data (user plain data), control plain data and the like for the user terminal 20.

In addition, the transmitting section and receiving section of the base station 10 in the present disclosure may be comprised of at least one of the transmitting/receiving section 120, transmitting/receiving antenna 130 and transmission line interface 140.

In addition, when the user terminal 20 is not provided with any CORESETPoolIndex or is provided with a CORESETPoolIndex with a value of "0" for one or more first control resource sets (COntrol REsource SETs (CORESETs)) and is provided with a CORESETPoolIndex with a value of "1" for one or more second CORESETs on an active Downlink Bandwidth Part (DL BWP) of a serving cell, and Acknowledgement (ACK)/Negative Acknowledgement (NACK) feedback mode=joint feedback is provided for the serving cell, the control section 110 may assume that the terminal judges indexing of Physical Downlink Control Channel (PDCCH) monitoring occasions or Downlink Control Information (DCI) formats associated with the joint feedback.

The transmitting/receiving section 120 may receive a HARQ-ACK transmitted using a Hybrid Automatic Repeat reQuest (HARQ)-ACK codebook or Physical Uplink Control Channel (PUCCH) resource determined based on the indexing.

(User Terminal)

Figure 5:
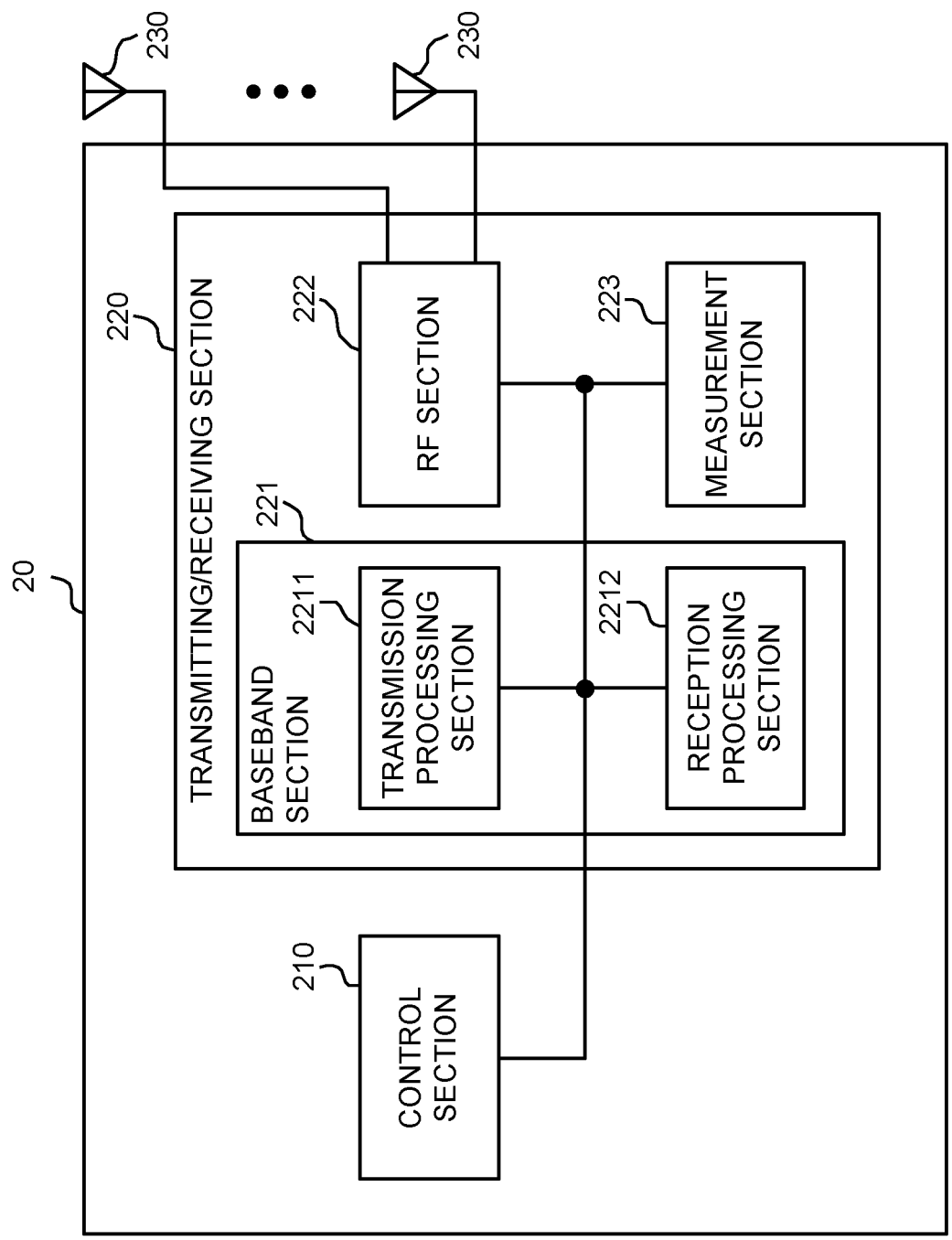
FIG. 5 is a diagram showing one example of a configuration of a user terminal according to one Embodiment.

FIG. 5 is a diagram showing one example of a configuration of the user terminal according to one Embodiment. The user terminal 20 is provided with a control section 210, transmitting/receiving section 220, and transmitting/receiving antennas 230. In addition, the user terminal may be provided with one or more of each of the control section 210, transmitting/receiving section 220 and transmitting/receiving antenna 230.

In addition, this example mainly illustrates function blocks of feature parts in this Embodiment, and the user terminal 20 may be assumed to have other function blocks required for radio communication. A part of processing of each section described below may be omitted.

The control section 210 performs control of the entire user terminal 20. The control section 210 is capable of being comprised of a controller, control circuit and the like explained based on the common recognition in the technical field according to the present disclosure.

The control section 210 may control generation of signals, mapping and the like. The control section 210 may control transmission/reception, measurement and the like using the transmitting/receiving section 220 and transmitting/receiving antenna 230. The control section 210 may generate data, control information, sequence and the like to transmit as a signal, and transfer the resultant to the transmitting/receiving section 220.

The transmitting/receiving section 220 may include a baseband section 221, RF section 222 and measurement section 223. The baseband section 221 may include a transmission processing section 2211 and reception processing section 2212. The transmitting/receiving section 220 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 220 may be comprised as an integrated transmitting/receiving section, or may be comprised of a transmitting section and a receiving section. The transmitting section may be comprised of a transmission processing section 2211 and RF section 222. The receiving section may be comprised of a reception processing section 2212, RF section 222, and measurement section 223.

The transmitting/receiving antenna 230 is capable of being comprised of an antenna, for example, an array antenna and the like explained based on the common recognition in the technical field according to the present disclosure.

The transmitting/receiving section 220 may receive the above-mentioned downlink channel, synchronization signal, downlink reference signal and the like. The transmitting/receiving section 220 may transmit the above-mentioned uplink channel, uplink reference signal and the like.

The transmitting/receiving section 220 may form at least one of a transmission beam and reception beam, using digital beam forming (e.g., precoding), analog beam forming (e.g., phase rotation) and the like.

The transmitting/receiving section 220 (transmission processing section 2211) may perform, for example, on the data, control information and the like acquired from the control section 210, processing of PDCP layer, processing (e.g., RLC retransmission control) of RLC layer, processing (e.g., HARQ retransmission control) of MAC layer and the like to generate a bit sequence to transmit.

The transmitting/receiving section 220 (transmission processing section 2211) may perform, on the bit sequence to transmit, transmission processing such as channel coding (which may include error correcting coding), modulation, mapping, filter processing, DFT processing (as necessary), IFFT processing, precoding and digital-analog conversion, and output a baseband signal.

In addition, whether or not to apply the DFT processing may be based on configuration of transform precoding. In the case where transform precoding is enabled on some channel (e.g., PUSCH), the transmitting/receiving section 220 (transmission processing section 2211) may perform the DFT processing as the above-mentioned transmission processing so as to transmit the channel using a DFT-s-OFDM waveform. In the other case, the section may not perform the DFT processing as the above-mentioned transmission processing.

The transmitting/receiving section 220 (FR section 222) may perform modulation to a radio frequency band, filter processing, amplification and the like on the baseband signal to transmit a signal of the radio frequency band via the transmitting/receiving antenna 230.

On the other hand, the transmitting/receiving section 220 (RF section 222) may perform amplification, filter processing, demodulation to a baseband signal and the like on a signal of the radio frequency band received by the transmitting/receiving antenna 230.

The transmitting/receiving section 220 (reception processing section 2212) may apply reception processing such as analog-digital conversion, FTT processing, IDFT processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 220 (measurement section 223) may perform measurement on a received signal. For example, based on the received signal, the measurement section 223 may perform RRM measurement, CSI measurement and the like. The measurement section 223 may measure received power (e.g., RSRP), received quality (e.g., RSRQ, SINR, SNR), signal strength (e.g., RSSI), propagation path information (e.g., CSI) and the like. The measurement result may be output to the control section 210.

In addition, the transmitting section and receiving section of the user terminal 20 in the present disclosure may be comprised of at least one of the transmitting/receiving section 220, transmitting/receiving antenna 230 and transmission line interface 240.

In addition, when the terminal is not provided with any CORESETPoolIndex or is provided with a CORESETPoolIndex with a value of "0" for one or more first control resource sets (COntrol REsource SETs (CORESETs)) and is provided with a CORESETPoolIndex with a value of "1" for one or more second CORESETs on an active Downlink Bandwidth Part (DL BWP) of a serving cell, and Acknowledgement (ACK)/Negative Acknowledgement (NACK) feedback mode=joint feedback is provided for the serving cell, the control section 210 may judge indexing of Physical Downlink Control Channel (PDCCH) monitoring occasions or Downlink Control Information (DCI) formats associated with the joint feedback.

The transmitting/receiving section 220 may transmit a HARQ-ACK, using a Hybrid Automatic Repeat reQuest (HARQ)-ACK codebook or Physical Uplink Control Channel (PUCCH) resource determined based on the indexing.

For example, the control section 210 may judge the rule (indexing rule) to determine whether indexes of the PCCCH monitoring occasions or DCI formats associated with the first CORESET are larger or smaller than indexes of the PCCCH monitoring occasions or DCI formats associated with the second CORESET.

For example, the control section 210 may assume that PDCCH monitoring occasions for the first CORESET are indexed prior to PDCCH monitoring occasions for the second CORESET for the same start time of search space sets. Indexes obtained by prior indexing may correspond to smaller index values or may correspond to larger index values.

The control section 210 may assume that DCI formats detected from PDCCH reception in the first CORESET are indexed prior to DCI formats detected from PDCCH reception in the second CORESET for the same PDCCH monitoring occasion.

(Hardware Configuration)

In addition, the block diagrams used in explanation of the above-mentioned Embodiments show blocks on a function-by-function basis. These function blocks (configuration sections) are actualized by any combination of at least one of hardware and software. Further, the method for actualizing each function block is not limited particularly. In other words, each function block may be actualized using a single apparatus combined physically or logically, or two or more apparatuses that are separated physically or logically are connected directly or indirectly (e.g., using cable, radio, etc.), and each function block may be actualized using a plurality of these apparatuses. The function block may be actualized by combining the above-mentioned one apparatus or the above-mentioned plurality of apparatuses and software.

Herein, the function includes judging, determining, deciding, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning and the like, but is not limited thereto. For example, the function block (configuration section) having the function of transmitting may be called a transmitting unit, transmitter and the like. In any case, as described above, the actualizing method is not limited particularly.

Figure 6:
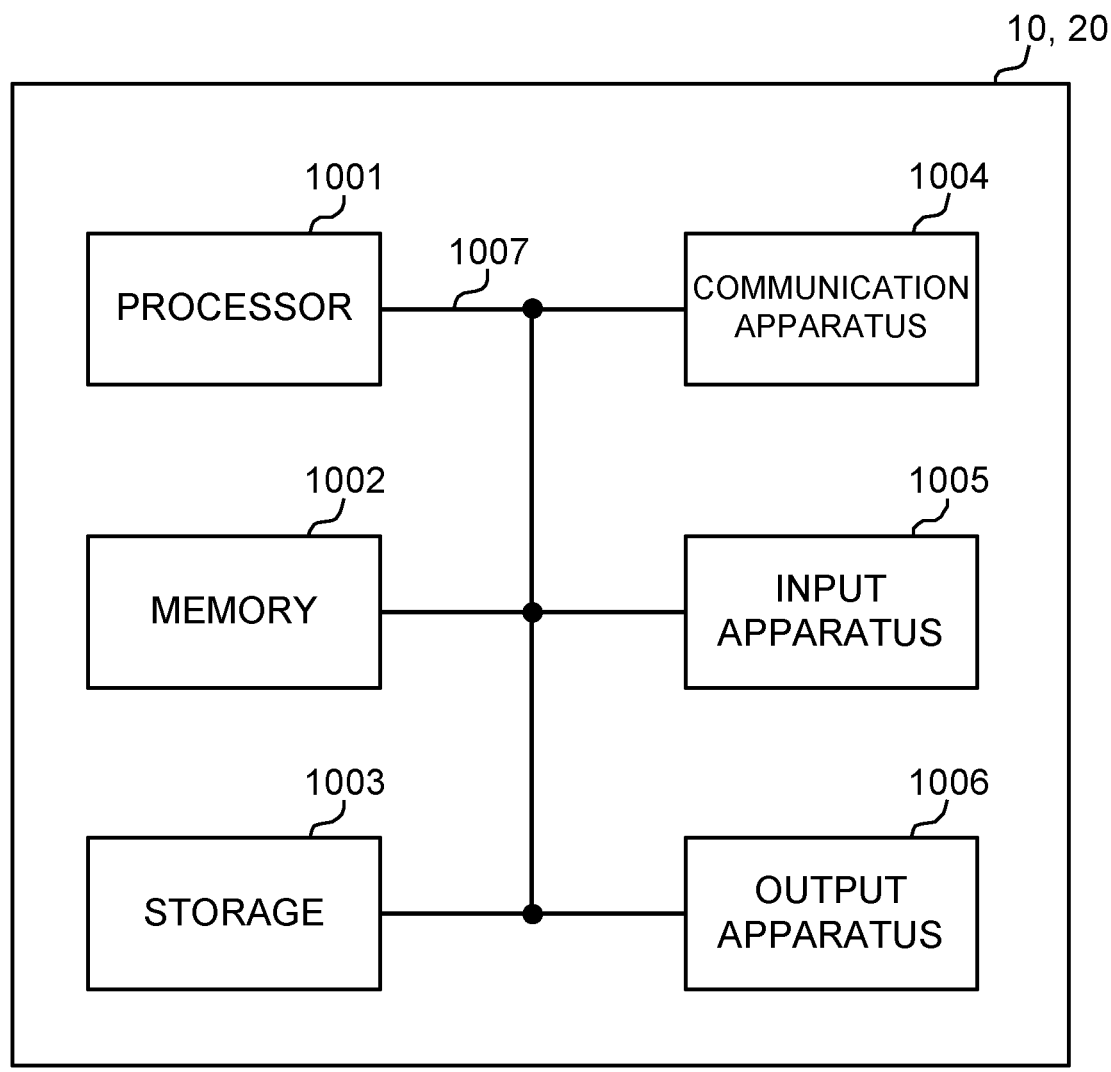
FIG. 6 is a diagram showing one example of hardware configurations of the base station and user terminal according to one Embodiment.

For example, each of the base station, user terminal and the like in one Embodiment of the present disclosure may function as a computer that performs the processing of the radio communication method of the disclosure. FIG. 6 is a diagram showing one example of a hardware configuration of each of the base station and user terminal according to one Embodiment. Each of the base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the present disclosure, it is possible to read the letter of apparatus, circuit, device, section, unit and the like with one another. With respect to each apparatus shown in the figure, the hardware configuration of each of the base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by two or more processors at the same time, sequentially or using another technique. In addition, the processor 1001 may be implemented on one or more chips.

For example, each function in the base station 10 and user terminal 20 is actualized in a manner such that predetermined software (program) is read on the hardware of the processor 1001, memory 1002 and the like, and that the processor 1001 thereby performs computations, and controls communication via the communication apparatus 1004, and at least one of read and write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, at least a part of the above-mentioned control section 110 (210), transmitting/receiving section 120 (220) and the like may be actualized by the processor 1001.

Further, the processor 1001 reads the program (program code), software module, data and the like on the memory 1002 from at least one of the storage 1003 and the communication apparatus 1004, and according thereto, executes various kinds of processing. Used as the program is a program that causes the computer to execute at least a part of operation described in the above-mentioned Embodiments. For example, the control section 110 (210) may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM), Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to one Embodiment of the present disclosure.

The storage 1003 is a computer-readable storage medium, and for example, may be comprised of at least one of a flexible disk, floppy (Registered Trademark) disk, magneto-optical disk (e.g., compact disk (Compact Disc ROM (CD-ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via at least one of a wired network and a wireless network, and for example, is also referred to as a network device, network controller, network card, communication module and the like. For example, in order to actualize at least one of Frequency Division Duplex (FDD) and Time Division Duplex (TDD), the communication apparatus 1004 may be comprised by including a high-frequency switch, duplexer, filter, frequency synthesizer and the like. For example, the transmitting/receiving section 120 (220), transmitting/receiving antenna 130 (230) and the like as described above may be actualized by the communication apparatus 1004. The transmitting/receiving section 120 (220) may be made by physically or logically separated implementation using a transmitting section 120a (220a) and receiving section 120b (220b).

The input apparatus 1005 is an input device (e.g., keyboard, mouse, microphone, switch, button, sensor, etc.) that receives input from the outside. The output apparatus 1006 is an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between respective apparatuses.

Furthermore, each of the base station 10 and user terminal 20 may be configured by including hardware such as a microprocessor, Digital Signal Processor (DSP), Application Specific Integrated Circuit (ASIC), Programmable Logic Device (PLD), and Field Programmable Gate Array (FPGA), and a part or the whole of each function block may be actualized using the hardware. For example, the processor 1001 may be implemented using at least one of the hardware.

(Modification)

In addition, the term explained in the present disclosure and the term required to understand the present disclosure may be replaced with a term having the same or similar meaning. For example, the channel, symbol and signal (or signaling) may be read with one another. Further, the signal may be a message. The reference signal is capable of being abbreviated as RS, and according to the standard to apply, may be called a pilot, pilot signal and the like. Furthermore, the component carrier (CC) may be called a cell, frequency carrier, carrier frequency and the like.

A radio frame may be comprised of one or a plurality of frames in the time domain. The one or each of the plurality of frames constituting the radio frame may be called a subframe. Further, the subframe may be comprised of one or a plurality of slots in the time domain. The subframe may be a fixed time length (e.g., 1 ms) that is not dependent on numerology.

Herein, the numerology may be a communication parameter applied to at least one of transmission and reception of some signal or channel. For example, the numerology may indicate at least one of SubCarrier Spacing (SCS), bandwidth, symbol length, cyclic prefix length, Transmission Time Interval (TTI), the number of symbols per TTI, radio frame configuration, particular filtering processing performed by a transmitter/receiver in the frequency domain, particular windowing processing performed by a transmitter/receiver in the time domain and the like.

The slot may be comprised of one or a plurality of symbols (Orthogonal Frequency Division Multiplexing (OFDM) symbols, Single Carrier Frequency Division Multiple Access (SC-FDMA) symbols and the like) in the time domain. Further, the slot may a time unit based on numerology.

The slot may include a plurality of mini-slots. Each mini-slot may be comprised of one or a plurality of symbols in the time domain. Further, the mini-slot may be called a subslot. The mini-slot may be comprised of the number of symbols lower than the slot. A PDSCH (or PUSCH) transmitted in a time unit larger than the mini-slot may be called PDSCH (PUSCH) mapping type A. A PDSCH (or PUSCH) transmitted using the mini-slot may be called PDSCH (PUSCH) mapping type B.

Each of the radio frame, subframe, slot, mini-slot and symbol represents a time unit in transmitting a signal. For the radio frame, subframe, slot, mini-slot and symbol, another name corresponding to each of them may be used. In addition, the time units such as the frame, subframe, slot, mini-slot and symbol in the present disclosure may be read with one another.

For example, one subframe may be called TTI, a plurality of contiguous subframes may be called TTI, or one slot or one mini-slot may be called TTI. In other words, at least one of the subframe and TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block, codeword and the like, or may be a processing unit of scheduling, link adaptation and the like. In addition, when the TTI is given, a time segment (e.g., the number of symbols) to which the transport block, code block, codeword and the like are actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in 3GPP LTE Rel.8-12), normal TTI, long TTI, ordinary subframe, normal subframe, long subframe, slot and the like. The TTI shorter than the ordinary TTI may be called shortened TTI, short TTI, partial or fractional TTI, shortened subframe, short subframe, mini-slot, subslot, slot and the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. The number of subcarriers contained in the RB may be the same irrespective of the numerology, and for example, may be "12". The number of subcarriers contained in the RB may be determined based on the numerology.

Further, the RB may include one or a plurality of symbols in the time domain, and may be a length of 1 slot, 1 mini-slot, 1 subcarrier, or 1 TTI. Each of 1 TTI, 1 subframe and the like may be comprised of one or a plurality of resource blocks.

In addition, one or a plurality of RBs may be called a physical resource block (Physical RB (PRB)), subcarrier group (Sub-Carrier Group (SCG)), Resource Element Group (REG), PRB pair, RB pair and the like.

Further, the resource block may be comprised of one or a plurality of resource elements (Resource Element (RE)). For example, 1 RE may be a radio resource region of 1 subcarrier and 1 symbol.

A Bandwidth Part (BWP) (which may be called a partial bandwidth, etc.) may represent a subset of contiguous common RBs (common resource blocks) for some numerology in some carrier. Herein, the common RB may be identified by an index of the RB with a common reference point of the carrier as reference. The PRB may be defined by some BWP, and may be numbered within the BWP.

The BWP may include UL BWP (BWP for UL) and DL BWP (BWP for DL). For a UE, one or a plurality of BWPs may be configured within one carrier.

At least one of configured BWPs may be active, and the UE may not assume that a predetermined signal/channel is transmitted and received outside the active BWP. In addition, the "cell", "carrier" and the like in the present disclosure may be read with the "BWP".

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present disclosure may be expressed using an absolute value, may be expressed using a relative value from a predetermined value, or may be expressed using another corresponding information. For example, the radio resource may be indicated by a predetermined index.

The names used in the parameter and the like in the present disclosure are not restrictive names in any respects. Further, equations and the like using these parameters may be different from those explicitly disclosed in the disclosure. It is possible to identify various channels (PUCCH, PDCCH, etc.) and information elements, by any suitable names, and therefore, various names assigned to these various channels and information elements are not restrictive names in any respects.

The information, signal and the like explained in the present disclosure may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output at least one of from a higher layer to a lower layer, and from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiments described in the present disclosure, and may be performed using another method. For example, notification of the information in the disclosure may be performed using physical layer signaling (e.g., Downlink Control Information (DCI), Uplink Control Information (UCI)), higher layer signaling (e.g., Radio Resource Control (RRC) signaling, broadcast information (Master Information Block (MIB)), System Information Block (SIB) and the like), Medium Access Control (MAC) signaling), other signals, or combination thereof.

In addition, the physical layer signaling may be called Layer 1/Layer 2 (L1/L2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to explicit notification, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using at least one of wired techniques (coaxial cable, optical fiber cable, twisted pair, Digital Subscriber Line (DSL) and the like) and wireless techniques (infrared, microwave and the like), at least one of the wired technique and the wireless technique is included in the definition of the transmission medium.

The terms of "system" and "network" used in the present disclosure are capable of being used interchangeably. A "network" may mean an apparatus (e.g., base station) included in the network.

In the present disclosure, the terms of "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "the number of layers", "rank", "resource", "resource set", "resource group", "beam", "beam width", "beam angle", "antenna", "antenna element", "panel" and the like are capable of being used interchangeably.

In the present disclosure, the terms of "Base Station (BS)", "radio base station", "fixed station", "NodeB", "eNB (eNodeB)", "gNB (gNodeB)", "access point", "Transmission Point (TP)", "Reception Point (RP)", "Transmission/Reception Point (TRP)", "panel", "cell", "sector", "cell group", "carrier", "component carrier" and the like are capable of being used interchangeably. There is the case where the base station is called by the terms of macrocell, small cell, femto-cell, pico-cell and the like.

The base station is capable of accommodating one or a plurality of (e.g., three) cells. When the base station accommodates a plurality of cells, the entire coverage area of the base station is capable of being segmented into a plurality of smaller areas, and each of the smaller areas is also capable of providing communication services by a base station sub-system (e.g., small base station (Remote Radio Head (RRH)) for indoor use). The term of "cell" or "sector" refers to a part or the whole of coverage area of at least one of the base station and the base station sub-system that perform communication services in the coverage.

In the present disclosure, the terms of "Mobile Station (MS)", "user terminal", "User Equipment (UE)", "terminal" and the like are capable of being used interchangeably.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting apparatus, receiving apparatus, radio communication apparatus and the like. In addition, at least one of the base station and the mobile station may be a device installed in a mobile unit, mobile unit itself and the like. The mobile unit may be a vehicle (e.g., car, airplane, etc.), may be a mobile unit (e.g., drone, self-driving car, etc.)

moving without human intervention, or may be a robot (crewed type or uncrewed type). In addition, at least one of the base station and the mobile station includes an apparatus that does always not move at the time of communication operation. For example, at least one of the base station and the mobile station may be an Internet of Things (IoT) device such as a sensor.

Further, the base station in the present disclosure may be read with the user terminal. For example, each Aspect/Embodiment of the disclosure may be applied to a configuration where communication between the base station and the user terminal is replaced with communication among a plurality of user terminals (for example, which may be called Device-to-Device (D2D), Vehicle-to-Everything (V2X), etc.). In this case, the functions that the above-mentioned base station 10 has may be the configuration that the user terminal 20 has. Further, the words of "up", "down" and the like may be read with a word (e.g., "side") that corresponds to Device-to-Device communication. For example, the uplink channel, downlink channel and the like may be read with a side channel.

Similarly, the user terminal in the present disclosure may be read with the base station. In this case, the functions that the above-mentioned user terminal 20 has may be the configuration that the base station 10 has.

In the present disclosure, operation performed by the base station may be performed by an upper node thereof in some case. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the disclosure is not limited thereto) except the base station, or combination thereof.

Each Aspect/Embodiment explained in the present disclosure may be used alone, may be used in combination, or may be switched and used according to execution. Further, with respect to the processing procedure, sequence, flowchart and the like of each Aspect/Embodiment explained in the disclosure, unless there is a contradiction, the order may be changed. For example, with respect to the methods explained in the disclosure, elements of various steps are presented in illustrative order, and are not limited to the presented particular order.

Each Aspect/Embodiment explained in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (e.g., x is an integer or decimal fraction)), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method, the next-generation system extended based thereon and the like. Further, a plurality of systems may be combined (e.g., combination of LTE or LTE-A and 5G, etc.) to apply.

The description of "based on" used in the present disclosure does not mean "based on only", unless otherwise specified. In other words, the description of "based on" means both of "based on only" and "based on at least".

Any references to elements using designations of "first", "second" and the like used in the present disclosure do not limit the amount or order of these elements overall. These designations are capable of being used in the disclosure as the useful method to distinguish between two or more elements. Accordingly, references of first and second elements do not mean that only two elements are capable of being adopted, or that the first element should be prior to the second element in any manner.

There is the case where the term of "determining" used in the present disclosure includes various types of operation. For example, "determining" may be regarded as "determining" judging, calculating, computing, processing, deriving, investigating, looking up (search, inquiry) (e.g., looking up in a table, database or another data structure), ascertaining and the like.

Further, "determining" may be regarded as "determining" receiving (e.g., receiving information), transmitting (e.g., transmitting information), input, output, accessing (e.g., accessing data in memory) and the like.

Furthermore, "determining" may be regarded as "determining" resolving, selecting, choosing, establishing, comparing and the like. In other words, "determining" may be regarded as "determining" some operation.

Still furthermore, "determining" may be read with "assuming", "expecting", "considering" and the like.

"Maximum transmit power" described in the present disclosure may mean a maximum value of transmit power, may mean "the nominal UE maximum transmit power", or may mean "the rated UE maximum transmit power".

The terms of "connected" and "coupled" used in the present disclosure or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present disclosure, in the case where two elements are connected, it is possible to consider that two elements are mutually "connected" or "coupled", by using one or more electric wires, cable, print electric connection, etc. and as some non-limited and non-inclusive examples, electromagnetic energy having wavelengths in a radio frequency region, microwave region and light (both visible and invisible) region, or the like.

In the present disclosure, the term of "A and B are different" may mean that "A and B are different from each other". In addition, the term may mean that "each of A and B is different from C". The terms of "separate", "coupled" and the like may be interpreted in the same manner as "different".

In the case of using "include", "including", and modifications thereof in the present disclosure, as in the term of "comprising", these terms are intended to be inclusive. Further, the term of "or" used in the disclosure is intended to be not exclusive OR.

In the present disclosure, in the case where articles are added by translation, for example, as "a", "an" and "the" in English, the disclosure may include that nouns continued from these articles are in the plural.

As described above, the invention according to the present disclosure is described in detail, but it is obvious to a person skilled in the art that the invention according to the disclosure is not limited to the Embodiments described in the disclosure. The invention according to the disclosure is capable of being carried into practice as modified and changed aspects without departing from the subject matter and scope of the invention defined by the descriptions of the scope of the claims. Accordingly, the descriptions of the disclosure are intended for illustrative explanation, and do not provide the invention according to the disclosure with any restrictive meaning.

The invention claimed is:

1. A terminal comprising:
a receiver that, for a plurality of Physical Downlink Shared Channels (PDSCHs) from a plurality of Transmission/Reception Points (TRPs), receives a higher layer parameter indicating one of a first Acknowledgement (ACK)/Negative Acknowledgement (NACK) feedback for transmitting an individual Hybrid Automatic Repeat reQuest (HARQ)-ACK to each TRP and a second ACK/NACK feedback for transmitting a HARQ-ACK corresponding to the plurality of PDSCHs from the plurality of TRPs to one TRP;
a processor that, if, in an active Downlink Bandwidth Part (DL BWP) of a serving cell, a COntrol REsource SET (CORESET) pool index is not provided or a CORESET pool index with value 0 is provided for one or more first CORESETs and a CORESET pool index with value 1 is provided for one or more second CORESETs, and if the second ACK/NACK feedback is indicated by the higher layer parameter for the serving cell, determines, based on a time domain, an index of Physical Downlink Control Channel (PDCCH) monitoring occasions associated with the second ACK/NACK feedback, and determines indexing of the PDCCH monitoring occasions in ascending order of start times of CORESETs associated with the PDCCH monitoring occasions; and
a transmitter that transmits the HARQ-ACK corresponding to the plurality of PDSCHs by using a HARQ-ACK codebook determined based on the indexing.

2. A radio communication method for a terminal, comprising:
for a plurality of Physical Downlink Shared Channels (PDSCHs) from a plurality of Transmission/Reception Points (TRPs), receiving a higher layer parameter indicating one of a first Acknowledgement (ACK)/Negative Acknowledgement (NACK) feedback for transmitting an individual Hybrid Automatic Repeat reQuest (HARQ)-ACK to each TRP and a second ACK/NACK feedback for transmitting a HARQ-ACK corresponding to the plurality of PDSCHs from the plurality of TRPs to one TRP;
if, in an active Downlink Bandwidth Part (DL BWP) of a serving cell, a COntrol REsource SET (CORESET) pool index is not provided or a CORESET pool index with value 0 is provided for one or more first CORESETs and a CORESET pool index with value 1 is provided for one or more second CORESETs, and if the second ACK/NACK feedback is indicated by the higher layer parameter for the serving cell, determining, based on a time domain, an index of Physical Downlink Control Channel (PDCCH) monitoring occasions associated with the second ACK/NACK feedback, and determining indexing of the PDCCH monitoring occasions in ascending order of start times of CORESETs associated with the PDCCH monitoring occasions; and
transmitting the HARQ-ACK corresponding to the plurality of PDSCHs by using a HARQ-ACK codebook determined based on the indexing.

3. A base station comprising:
a transmitter that, for a plurality of Physical Downlink Shared Channels (PDSCHs) from a plurality of Transmission/Reception Points (TRPs), transmits a higher layer parameter indicating one of a first Acknowledgement (ACK)/Negative Acknowledgement (NACK) feedback for transmitting an individual Hybrid Automatic Repeat reQuest (HARQ)-ACK to each TRP and a second ACK/NACK feedback for transmitting a HARQ-ACK corresponding to the plurality of PDSCHs from the plurality of TRPs to one TRP;
a processor that, if, in an active Downlink Bandwidth Part (DL BWP) of a serving cell, a terminal is not provided with a Control REsource SET (CORESET) pool index or is provided with a CORESET pool index with value 0 for one or more first CORESETs and is provided with a CORESET pool index with value 1 for one or more second CORESETs, and if the second ACK/NACK feedback is indicated by the higher layer parameter for the serving cell, assumes that the terminal determines, based on a time domain, an index of Physical Downlink Control Channel (PDCCH) monitoring occasions associated with the second ACK/NACK feedback and determines indexing of the PDCCH monitoring occasions in ascending order of start times of CORESETs associated with the PDCCH monitoring occasions; and
a receiver that receives the HARQ-ACK, transmitted using a HARQ-ACK codebook determined based on the indexing, corresponding to the plurality of PDSCHs.

4. A system comprising a terminal and a base station, wherein the terminal comprises:
a receiver of the terminal that, for a plurality of Physical Downlink Shared Channels (PDSCHs) from a plurality of Transmission/Reception Points (TRPs), receives a higher layer parameter indicating one of a first Acknowledgement (ACK)/Negative Acknowledgement (NACK) feedback for transmitting an individual Hybrid Automatic Repeat reQuest (HARQ)-ACK to each TRP and a second ACK/NACK feedback for transmitting a HARQ-ACK corresponding to the plurality of PDSCHs from the plurality of TRPs to one TRP;
a processor of the terminal that, if, in an active Downlink Bandwidth Part (DL BWP) of a serving cell, a Control REsource SET (CORESET) pool index is not provided or a CORESET pool index with value 0 is provided for one or more first CORESETs and a CORESET pool index with value 1 is provided for one or more second CORESETs, and if the second ACK/NACK feedback is indicated by the higher layer parameter for the serving cell, determines, based on a time domain, an indexing of Physical Downlink Control Channel (PDCCH) monitoring occasions associated with the second ACK/NACK feedback, and determines indexing of the PDCCH monitoring occasions in ascending order of start times of CORESETs associated with the PDCCH monitoring occasions; and
a transmitter of the terminal that transmits the HARQ-ACK corresponding to the plurality of PDSCHs by using a HARQ-ACK codebook determined based on the indexing, and the base station comprises:
  a transmitter of the base station that transmits the higher layer parameter;
  a processor of the base station that assumes that the terminal determines, based on the time domain, the index of the PDCCH monitoring occasions and determines the indexing of the PDCCH monitoring occasions in ascending order of the start times of the CORESETs associated with the PDCCH monitoring occasions; and
  a receiver of the base station that receives the HARQ-ACK corresponding to the plurality of PDSCHs.

* * * * *